United States Patent [19]

Ostertag et al.

[11] Patent Number: 4,702,775
[45] Date of Patent: Oct. 27, 1987

[54] PREPARATION OF MAGNETITE PIGMENTS: CONTROL OF PARTICLE SIZE

[75] Inventors: Werner Ostertag, Gruenstadt; Henning Wienand, Neulussheim; Roland Bauer, Bergisch-Gladbach, all of Fed. Rep. of Germany

[73] Assignee: BASF Aktiengesellschaft, Ludwigshafen, Fed. Rep. of Germany

[21] Appl. No.: 878,220

[22] Filed: Jun. 25, 1986

[30] Foreign Application Priority Data

Jun. 29, 1985 [DE] Fed. Rep. of Germany ....... 3523317

[51] Int. Cl.$^4$ ........................ C01G 49/08; C03G 9/14
[52] U.S. Cl. ................................... 106/304; 106/306; 106/309
[58] Field of Search .......................................... 106/304

[56] References Cited

U.S. PATENT DOCUMENTS 4,024,232 5/1977 Garberi et al. ...................... 423/632
4,090,888 5/1978 Rademachers et al. ............ 106/304
4,382,822 5/1983 Mayer ................................ 106/304

FOREIGN PATENT DOCUMENTS 1534196 11/1978 United Kingdom .................... 49/08

Primary Examiner—A. Lionel Clingman
Attorney, Agent, or Firm—Keil & Weinkauf

[57] ABSTRACT

Magnetite pigments are prepared from iron(II) salt solutions by a process in which the mean particle size can be brought to a value within the range from 0.06 to 0.5 μm by means of a residence stage between the precipitation stage and the oxidation stage.

2 Claims, No Drawings

PREPARATION OF MAGNETITE PIGMENTS: CONTROL OF PARTICLE SIZE

The present invention relates to a process for the preparation of magnetite pigments from iron(II) salt solutions, wherein the mean particle size can be brought to a specific value within the range from 0.06 to 0.5 μm.

The preparation of magnetite pigments is known. They are usually obtained by adding to an iron(II) salt solution an amount of alkali or alkaline earth sufficient for precipitating the iron(II) ions and then oxidizing the iron hydroxide precipitate at elevated temperatures by passing through air. Most processes also envisage the use of pickling liquids or waste solutions from the production of titanium dioxide. Appropriate methods of preparation are described in, inter alia, German Laid-Open Applications DOS No. 2,508,085, DOS No. 2,721,013 and DOS No. 3,004,718 and U.S. Pat. No. 4,090,888.

The magnetite pigments obtained in this manner or in a similar manner are predominantly used in the form of black or colored pigments or as magnetic pigments for toners in reprography. An important criterion with regard to its use, particularly in the colored pigment sector, is that the magnetite be brought to the required particle size. For example, the shade of the magnetite and, for example, that of the red pigments prepared by calcining the magnetite depend on the particle size. Similarly, the fixability of magnetite-containing single-component toner particles is also affected by the particle size of the magnetite. There has therefore been no lack of attempts to influence the particle size of the synthetic magnetite through the preparation process.

For example, German Laid-Open Application DOS No. 2,508,085 describes a process for controlling the particle size of magnetite, in which lepidocrocite is added to the suspension obtained by adding an alkali to iron sulfate to produce a precipitate. The particle size of the magnetite can be influenced by the amount of lepidocrocite added, the particle size decreasing in proportion to the increase in the amount of lepidocrocite added. However, this process has the disadvantage that lepidocrocite having a specific particle size has to be employed, and the resulting product is inhomogeneous, which, although not directly unfavorable in terms of color classification, does however have an adverse effect on the magnetic properties of the magnetite pigment.

It is an object of the present invention to provide a process for the preparation of magnetite pigments which enables a certain particle size to be obtained in a reliable and reproducible manner by the provision of an additional procedural step, but does not have the above disadvantages.

We have found that this object is achieved in a simple manner by a process for the preparation of magnetite pigments in which an aqueous iron(II) salt solution is added to an aqueous solution of an alkali metal or alkaline earth metal hydroxide at pH 7 to 14 and from 60° to 100° C. in a precipitation stage, and the iron hydroxide precipitate is oxidized in a subsequent oxidation stage by passing in an oxygen-containing gas at from 60° to 100° C. until the Fe(II)/Fe(III) ratio reaches from 0.5 to 0.23, if, in a residence stage between the precipitation and oxidation stages, the suspension is stirred for from 5 to 180 minutes while maintaining the pH and temperature.

In an advantageous embodiment of the novel process, during the residence stage stirring is carried out and/or nitrogen gas is blown into the suspension.

The preparation of the magnetite pigments is known per se. For example, the amount of alkali or alkaline earth required to precipitate the total amount of iron(II) ions is initially charged into a heatable kettle and heated to 60° to 100° C., preferably 70° to 90° C. Thereafter, the total amount of iron(II) salt solution is added, while stirring and maintaining a pH of from 7 to 14, preferably from 8 to 12, the addition advantageously being carried out in the course of 30 minutes. According to the invention, the suspension formed as a result of the precipitation is then stirred for from 5 to 180 minutes while maintaining the temperature and pH, and optionally passing through nitrogen gas, the mean particle size of the resulting magnetite pigment being determined by the duration of the residence stage. It may be used as a parameter for obtaining the particle size in a reproducible manner. The mean particle size can be adjusted to a specific value within the range from 0.06 to 0.5 μm, the mean particle size increasing with the duration of the residence stage. At the end of the residence stage, the iron hydroxide precipitate in the suspension is oxidized, while stirring, by passing in an oxygen-containing gas, usually air, at from 60° to 100° C. The end product of the oxidation can be determined in a simple manner from the Fe(II)/Fe(III) ratio. In practice, slight overoxidation is often tolerated, the extent of which is found analytically in a simple manner by determining the Fe(II) and Fe(III) contents. Finally, the resulting magnetic pigment is filtered off, washed and dried.

The novel process makes it possible to prepare magnetite pigments reproducibly in a simple manner with adjustment of the particle size to a value within the range from 0.06 to 0.5 μm. The possibility of so modifying a conventional process by the inclusion of a single addition step, the residence stage, that magnetite having the required particle size is obtained was surprising and unforeseeable. Another advantageous result of the novel process is the narrow particle size distribution of the magnetite whose mean particle size has been brought to a specific value.

The Examples which follow further illustrate the invention.

EXAMPLE 1

195.2 g of solid NaOH and 1.5 l of $H_2O$ were introduced into a heatable 4 l glass container equipped with a stirrer and were stirred until dissolution was complete. The NaOH solution was heated to 80° C., after which 678.2 g of technical grade $FeSO_4.nH_2O$ (19.8% by weight of Fe), dissolved in 2.5 l of $H_2O$, were added to the stirred solution in the course of 8 minutes. The pH after precipitation was 9.6±0.2.

The suspension was then stirred for 30 minutes at 80±5° C. at the said pH (residence stage). Thereafter, 20 l/h of air were passed into the suspension through a gas feed tube over a period of 5.5 h. During this time, stirring was continued (300 rpm), the temperature was kept at 80±5° C. and the pH was brought to 10.5±0.2 by the dropwise addition of 10% strength aqueous NaOH solution. After 5.0 to 5.4 hours, the Fe(II)/Fe(III) ratio fell below 0.5, as could be determined by titrating the Fe(II) content. The reaction was terminated after 5.5 hours. The resulting magnetite pigment was filtered off, washed and dried in a cabinet dryer under reduced pressure at 80° C.

The resulting pigment was deep black, gave the X-ray pattern of magnetite and had an Fe(II)/Fe(III) ratio of 0.4. The BET (N$_2$) specific surface area was 9.0 m$^2$/g. Electron micrographs showed that the mean particle size of the product, which was obtained in the form of cubic particles, was 0.3 μm. The magnetic properties determined in a magnetic field of 160 kA/m were as follows: coercive force H$_c$=12.0 kA/m, specific remanence M$_r$/ρ=16 nTm$^3$/g and specific saturation magnetization M$_m$/ρ=99 nTm$^3$/g.

EXAMPLES 2 TO 6

In the Examples below, the procedure described in Example 1 was followed, except that the respective durations of the residence stages were 6, 10, 35, 60 and 120 minutes. All products gave the X-ray pattern of magnetite.

The results are summarized in the Table.

TABLE

| Example | Residence stage (duration in minutes) | Mean diameter (from electron micrographs) | BET surface area [m$^3$/g] | H$_c$ [kA/m] | M$_m$/ρ [nTm$^3$/g] | M$_r$/ρ [nTm$^3$/g] |
| --- | --- | --- | --- | --- | --- | --- |
| 2 | 6 | 0.08 | 15 | 12.4 | 99 | 18 |
| 3 | 10 | 0.2 | 10 | 12.1 | 99 | 17 |
| 4 | 35 | 0.3 | 8.5 | 11.9 | 98 | 16 |
| 5 | 60 | 0.35 | 7.7 | 11.5 | 98 | 16 |
| 6 | 120 | 0.4 | 7 | 11.3 | 98 | 14 |

We claim:
1. A process for the preparation of a magnetite pigment by adding an aqueous iron(II) salt solution to an aqueous solution of an alkali metal or alkaline earth metal hydroxide at pH 7 to 14 and from 60° to 100° C., in a precipitation stage, and oxidizing the iron hydroxide precipitate in a subsequent oxidation stage by passing in an oxygen-containing gas at from 60° to 100° C. until the Fe(II)/Fe(III) ratio reaches from 0.5 to 0.23, wherein, in a residence stage between the precipitation stage and the oxidation stage, the suspension is stirred for from 5 to 180 minutes while maintaining the pH and temperature.
2. A process as claimed in claim 1, wherein, during the residence stage, stirring is carried out and/or nitrogen gas is blown into the suspension.

* * * * *